United States Patent [19]

Last, Jr. et al.

[11] Patent Number: 5,233,833
[45] Date of Patent: Aug. 10, 1993

[54] SEAL FOR MOUNTING FLANGE OF A MASTER CYLINDER

[75] Inventors: Walter W. Last, Jr., South Bend; Delmar J. Leidy, Jr., Mishawaka; Stuart B. Miller, South Bend, all of Ind.

[73] Assignee: Allied-Signal Inc., Morristown, N.J.

[21] Appl. No.: 967,582

[22] Filed: Oct. 28, 1992

[51] Int. Cl.⁵ .......................... B60T 13/00; F15B 2/10
[52] U.S. Cl. .............................. 60/547.001; 91/376 R; 92/99
[58] Field of Search ............... 91/369.1, 369.2, 376 R; 92/96, 98 R, 99, 100; 60/547.1, 565, 581, 593

[56] References Cited

U.S. PATENT DOCUMENTS

| | | | |
|---|---|---|---|
| 3,002,499 | 10/1961 | Schultz | 91/376 |
| 4,307,570 | 12/1981 | Yardley | 60/593 X |
| 4,434,619 | 3/1984 | Kobayashi | 60/547.1 |
| 4,455,827 | 6/1984 | Margetts | 91/369.2 X |
| 4,535,591 | 8/1985 | Kobayashi | 60/369.2 X |
| 4,608,826 | 9/1986 | Sawyer | 60/547.1 |

FOREIGN PATENT DOCUMENTS

| | | | |
|---|---|---|---|
| 0030767 | 7/1981 | Japan | 60/547.1 |
| 0039555 | 3/1983 | Japan | 60/547.1 |

*Primary Examiner*—Edward K. Look
*Assistant Examiner*—Hoang Nguyen
*Attorney, Agent, or Firm*—Leo H. McCormick, Jr.; Ken C. Decker

[57] ABSTRACT

A seal (22) having a cylindrical body (56) with a first bead (66) located between a mounting flange (42) on a master cylinder (12) and end wall (74) of a front shell (72) of a brake booster (14) and a second bead (68) retained on a piston (18) located in a bore (26) of the master cylinder (12). The cylindrical body (56) maintains the piston (18) in axial alignment with an output push rod (20) in the brake booster (14) when the mounting flange (42) is positioned on bolts (75, 75') extending from the end wall (74) of the front shell (72) to aid in the assembly of the master cylinder (12) with the brake booster (14).

5 Claims, 2 Drawing Sheets

SEAL FOR MOUNTING FLANGE OF A MASTER CYLINDER

This invention relates to a seal located between the mounting flange of a master cylinder and end wall of brake booster for preventing communication between an operational chamber in the booster and the surrounding environment while providing guidance for a position in the master cylinder and output push rod during assembly of the master cylinder with the brake booster.

It has been common practice for a brake system manufacturer to supply a vehicle manufacture with a brake booster having a master cylinder attached thereto a unitary structure. The vehicle manufacturer installed the brake booster with the master cylinder attached thereto on the assembly line of the vehicle. In an effort to reduce the overall space requirement for the components of the brake system it has been a general practice to recess the master cylinder into the brake booster as disclosed in U.S. Pat. No. 4,785,628. However, recently some vehicle manufacturers in order to have dual sources of supply have replaced the unitary assembly by a single supplier of the master cylinder and brake booster with separate suppliers for these components. The selection of separate suppliers requires means for retaining all of the components of the brake booster and master cylinder in place during shipment from the manufacturer to the assembly line. For instance, in the brake booster, the output push rod maybe retained in the movable wall by a return spring or some type of tang extending from the hub of the movable wall while as front seal as disclosed in U.S. Pat. No. 3,178,191 is held by frictioal engagement. Similarly, while the piston of the master cylinder is protected by a disposable plastic end cap. During the assembly of the vehicle, the brake booster is placed on the firewall and later the master cylinder is attached thereto. Unfortunately, during the later assembly under some conditions the piston of the master cylinder may not be aligned with the output push rod and front seal have been damaged during shipping to an extent that a potential leak may later occur between the brake booster and the surrounding environment.

In the present invention, we have devised a seal which is protected by the mounting flange of the master cylinder during shipping while at the same time offering guidance for the piston of the master cylinder with the output push rod of the brake booster during assembly on the vehicle. The seal has a cylindrical body with a first diameter section separated from a second diameter section by a shoulder. The first diameter section has an end with a first bead extending outwardly therefrom while the second diameter section has an end with a second bead extending inwardly therefrom. The first bead is located in a first groove on a face of the mounting flange while the second bead is located in a second groove on the peripheral surface of the piston of the master cylinder. The mounting flange is located on bolts that extend from the end wall of the brake booster and cylindrical body of the seal holds the piston in alignment with the output push rod while nuts are torqued onto the bolts to join the master cylinder to the brake booster. When the nuts have been torqued onto the bolts, the first bead of the cylindrical body is compressed between the end wall and mounting flange to form a seal to prevent communication between the chamber and the surrounding environment.

The seal in the present invention offer an advantage of protecting the piston of a master from contamination during shipment from a supplier to a vehicle manufacture, providing guidance for the piston in assembly with a brake booster and sealing an operational chamber from the environment.

This advantage should be apparent from reading this specification while viewing the drawings wherein.

Figure 1:
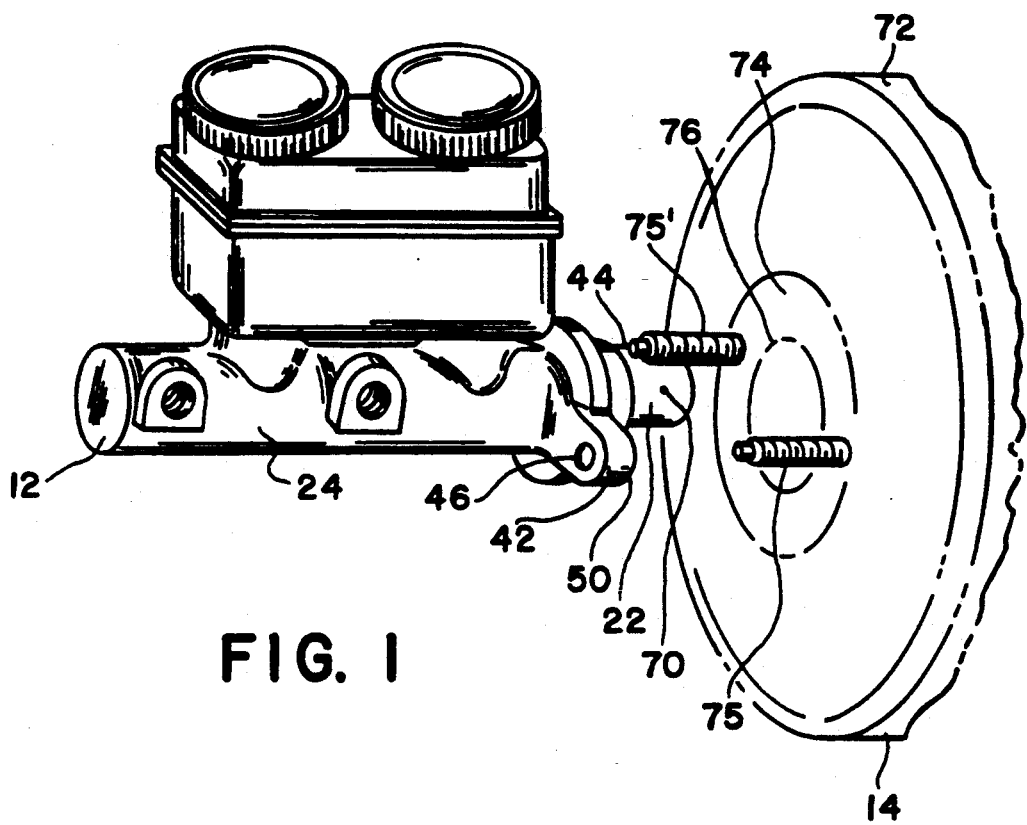
FIG. 1 is a schematic illustration of a master cylinder having a seal made according to the principles of this invention attached thereto and brake booster prior to being joined together in a vehicle.
Figure 2:
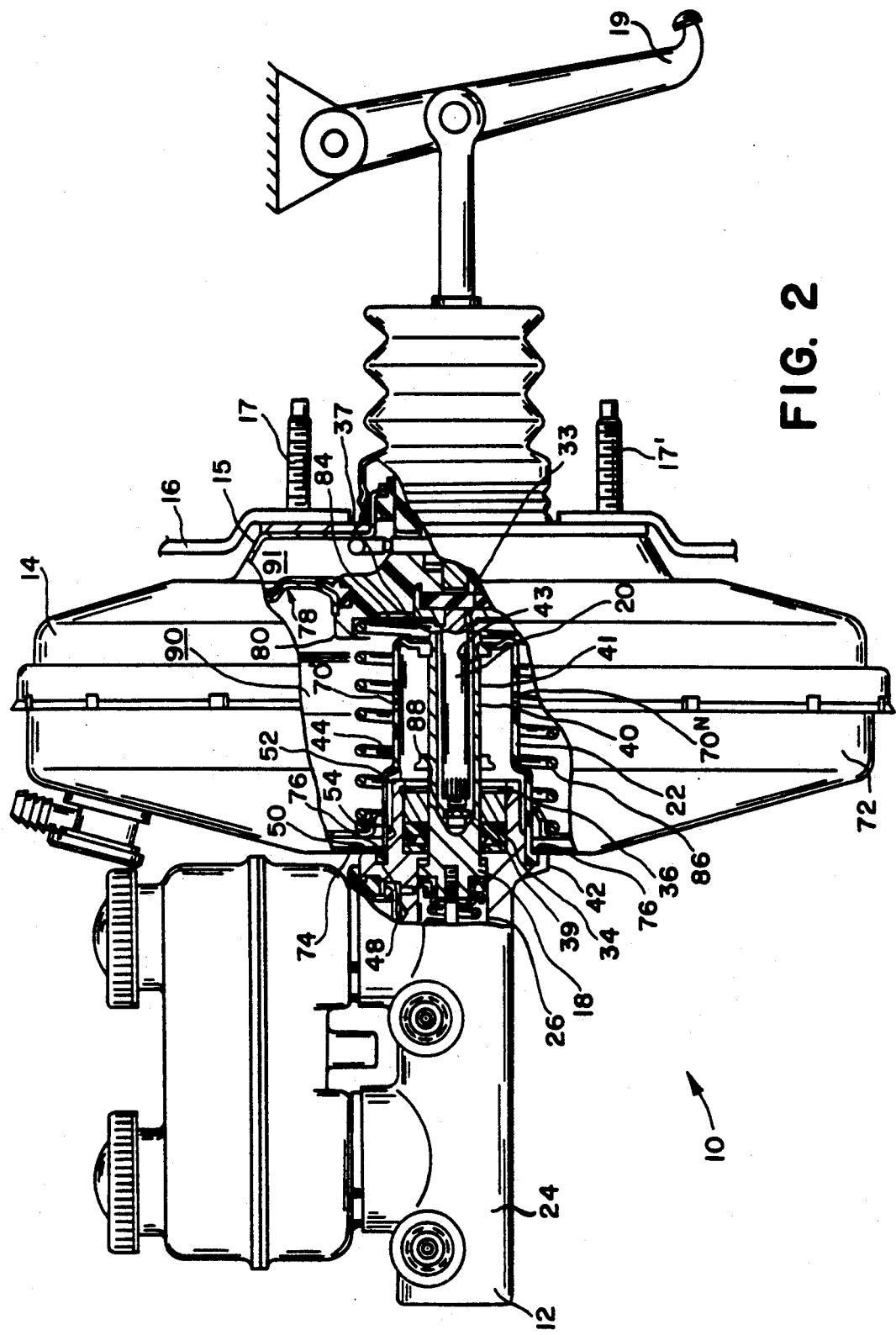
FIG. 2 is a schematic illustration of a brake booster and master cylinder attached to the firewall of a vehicle.

The brake actuation system 10 shown in FIG. 2 includes the master cylinder 12 and brake booster 14 of FIG. 1 attached to the firewall 16 of a vehicle. In this brake system 10 the master cylinder 12 and brake booster 14 were independently manufactured and designed to be installed on a vehicle at different times in an assembly line. Because of space requirements, the master cylinder 12 is recessed into the brake booster 14 and as a result the connection between the piston 18 and output push rod 20 can be a blind assembly. The seal 22 as best shown in FIG. 3 aids in the alignment of the piston 18 with the push rod 20 to assure that a satisfactory connection occurs.

In more particular detail, the master cylinder 12 selected for brake system 10 as manufactured and shown in FIG. 1 has a cylindrical housing 24 with a bore 26 for retaining a first piston and a second piston 18. A bearing seal arrangement 34 which surrounds piston 18 is retained in bore 26 by a snap ring 36. A stop located in housing 24 engages piston 18 to limit the distance a cylindrical projection 40 on piston 18 extends outside of housing 24. Piston 18 has a groove 43 located on peripheral surface 41 of cylindrical projection 40 adjacent end 33 and a blind axial bore 39 that extends from end 33 substantially through the cylindrical projection 40. A mounting flange 42 located adjacent end 44 of housing 24 set the limits as to how far the master cylinder 12 will extend into the brake booster 14. The mounting flange 42 has a plurality of openings 46 only one being shown in FIG. 1 and an annular groove 48 located on a face 50. The peripheral surface 52 on cylindrical housing 24 adjacent end 44 has a smaller diameter than seal ledge 54 adjacent face 50 to reduce the frictional resistance to the placing of seal 22 on the master cylinder 12 as later discussed herein.

Figure 3:
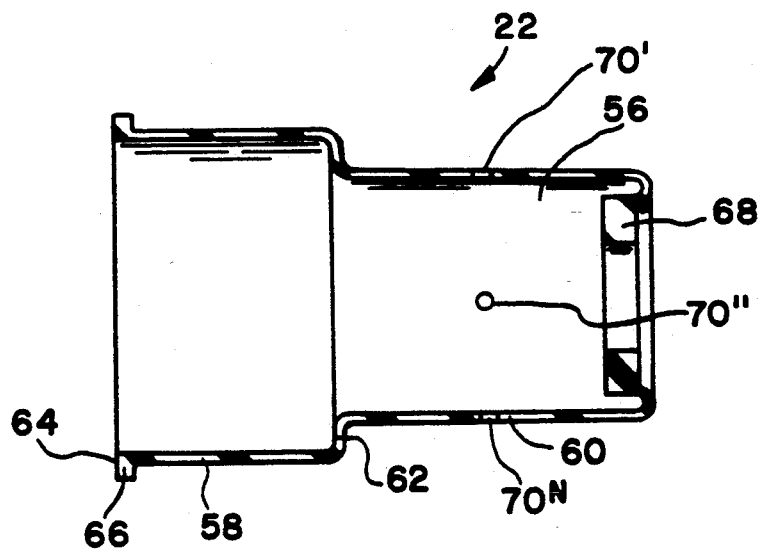
FIG. 3 is a perspective view of the seal of FIG. 1.

The seal 22 as shown in FIG. 3 has a cylindrical body 56 with a first diameter section 58 separated from second diameter section 60 by a shoulder 62. The first diameter section 58 has an end 64 with a first bead 66 extending outwardly therefrom while said second diameter section 60 has a second bead 68 inwardly extending therefrom. The second diameter section 60 has a plurality of openings 70, 70', ..., 70$^n$ which allows free communication into the interior of cylindrical body 56.

Seal 22 is positioned on housing 24 as one of the final steps in the assembly of master cylinder 12 as follows: The first diameter section 58 of seal 22 is positioned on peripheral surface 52 of housing 24 without frictional resistance until seal ledge 54 is engaged and thereafter a radial resistance force is encountered corresponding to the difference in the free diameter of first diameter section 58 and the diameter of seal ledge 54. A force sufficient to locate or seat bead 66 in groove 48 is applied to seal 22. Thereafter, bead 68 is positioned in groove 41 on piston 18. The second diameter section 60 has sufficient structural stability to maintain the cylindrical projection 40 of piston 18 in substantially the axial center of bore 26. Seal 22 in addition to providing guidance for piston 18 also protects the peripheral surface from contamination during shipping from the master cylinder assembly to an assembly line for a vehicle.

The vacuum brake booster 14 is of the type which has a front shell 72 with an end wall or member 74 having an opening 76 large enough to receive the cylindrical housing 24 of a master cylinder 12. The vacuum brake booster 14 has a movable wall 78 with a hub 80 for retaining a control valve not shown and output put push rod 20. Output push rod 82 is retained in engagement with hub 80 by disc 84 through which return spring 86 urges wall 78 toward a rest position. Output push rod 20 has an adjustable head 88 whose length is set during manufacture to provide a stroke corresponding to the size of master cylinder 12 selected for a particular automobile. Unfortunately, during shipping from the manufacturer to vehicle assembly plant head 88 is not supported and as a result only the force of return spring 86 acting through disc 84 holds head 88 in the axial center of opening 76.

The assembly of brake system 10 shown in FIG. 2 occurs on the assembly line in the following steps:

the output requirement of the master cylinder 12 and brake booster 14 are selected to meet a desired braking requirement corresponding to the vehicle specification;

after brake booster 14 is selected from a source of supply, it is transported on the assembly line and fixed to the firewall 16 of the vehicle by bolts 17, 17' secured to rear shell 15;

thereafter, a pedal 19 is connected to the control valve and the brake booster installation is substantially completed;

after the master cylinder 12 is selected from a source of supply, it is transported to the assembly line;

cylindrical projection 40 on piston 18 protected by seal 22 is aligned with opening 76 and openings 46 in mounting flange 42 are aligned with bolts 75, 75' that extend from end wall 74;

a force is applied to move cylindrical projection 40 into chamber 90 and guide surface 37 on cylindrical projection 40 engages head 88 on push rod 20, since cylindrical projection 40 is held in substantially the center of bore 26 by the structural rigidity of the first and second diameter sections of seal 22, axial alignment with push rod 20 does not cause a problem;

nuts are placed on bolts 75, 75' and torqued to bring flange face 50 into engagement with end wall 74 on shell 72, as bead 66 engages face 76 a compressive force establishes a seal to prevent communication from chamber 90 to the surrounding environment to complete the installation of master cylinder 12 to brake booster 14.

During a brake application, moveable wall 78 in brake booster 14 moves toward chamber 90 in response to a pressure differential created through the introduction of air to 91 rear chamber by the movement of the control valve in response to a force applied to the brake pedal 19. As wall 78 moves toward chamber 90 piston 18 moves in bore 26 to pressurize fluid therein and effect a brake application to supply wheel cylinders with pressurized fluid. As piston 18 moves, the pressure in chamber 90 is communicated into seal 22 by holes 70, 70', 70" to equalize the pressure therein as such and movement does not effect or change the fluid pressure acting on bearing seal member 34.

Thus, seal 22 allows for independent installation of a master cylinder 12 with a brake booster 14 while at the same time preventing communication from chamber 90 to the surrounding environment.

We claim:

1. In a brake system having a housing of a master cylinder mounted on a front shell of a brake booster, a first seal located between a face on the master cylinder and first shell and a second seal retained in a bore of the master cylinder and engaging a movable piston that extends through an opening in the front shell and into a chamber in the brake booster, said first seal preventing communication of fluid from the surrounding environment to the chamber, said second seal preventing communication from said chamber into said bore of the master cylinder, said movable piston receiving an output push rod extending from a wall of said brake booster, the improvement in said first seal comprising:

a cylindrical body having a first diameter section separated from second diameter section by a shoulder, said first diameter section having an end with a first flange extending outwardly therefrom, said first flange being located in a first groove on a face of said housing, said second diameter section having an end with a second flange extending inwardly therefrom, said second flange being located in a second groove on said movable piston, said shoulder providing structural stability for said first diameter section while centering said second diameter section to align said movable piston with respect to said opening in the front shell and said push rod extending from said wall.

2. In the brake system as recited in claim 1 wherein said second diameter section is further characterized by a plurality of openings which allows fluid in the chamber to be communicated to said second seal while allowing said second diameter section to move in said chamber without impeding the movement of said movable piston.

3. A method of assembling a master cylinder with a brake booster comprising the steps of:

selecting a master cylinder having a housing with a mounting flange, said mounting flange having a plurality of openings therein and a first annular groove located on a face and concentric to a first bore therein, said master cylinder having first and second pistons retained in said first bore, said first piston extending from said housing and having a second groove located on its peripheral surface adjacent an end thereof, said first piston having a blind axial bore that extends from said end thereof;

selecting a brake booster having a front shell with an opening therein and a plurality of bolts extending therefrom, said brake booster having a movable wall located in a chamber adjacent said front shell, said movable wall having an output member extending therefrom;

selecting a seal from a source of supply, said seal having a cylindrical body with a first diameter section separated from a second diameter section by a shoulder, said cylindrical body having an outwardly extending bead extending from said first diameter section and an inwardly extending bead extending from said second diameter section;

placing said outwardly extending bead of said seal in said first annular groove in the housing of said master cylinder and said outwardly extending bead in said second groove on said first piston;

attaching said brake booster to a mounting wall in a vehicle;

moving said master cylinder housing into alignment with said brake booster by placing said mounting flange on said brake booster with said bolts extending through said openings therein worth said first piston extending through said opening in said front shell into said chamber, said cylindrical body of said seal holding said first piston in alignment with said output member of said movement inserting said piston into said chamber, said first and second diameter sections of said seal holding said piston in alignment with said output member; and placing fasteners on said bolts to bring outwardly extending flange of said seal engages said end wall to seal said chamber from said environment.

4. The method of assembling a master cylinder with a brake booster as recited in claim 3 further comprising the steps of:

placing a plurality of openings in said second diameter section of said cylindrical body of said seal to allow free communication between said chamber and the bore of the housing of said master cylinder.

5. The method of assembling a master cylinder with a brake booster as recited in claim 4 further including the step of;

placing a guide surface on said mounting flange adjacent said face to reduce the frictional resistance required to position said outwardly extending flange in said groove.

* * * * *